FIG.I.

A. B. COWLES.
BOX FOLDING MACHINE.
APPLICATION FILED JAN. 7, 1909.

980,609.

Patented Jan. 3, 1911.
7 SHEETS—SHEET 2.

A. B. COWLES.
BOX FOLDING MACHINE.
APPLICATION FILED JAN. 7, 1909.

980,609.

Patented Jan. 3, 1911.
7 SHEETS—SHEET 5.

WITNESSES:
L. Thow
C. W. Carroll

INVENTOR:
Arthur B. Cowles

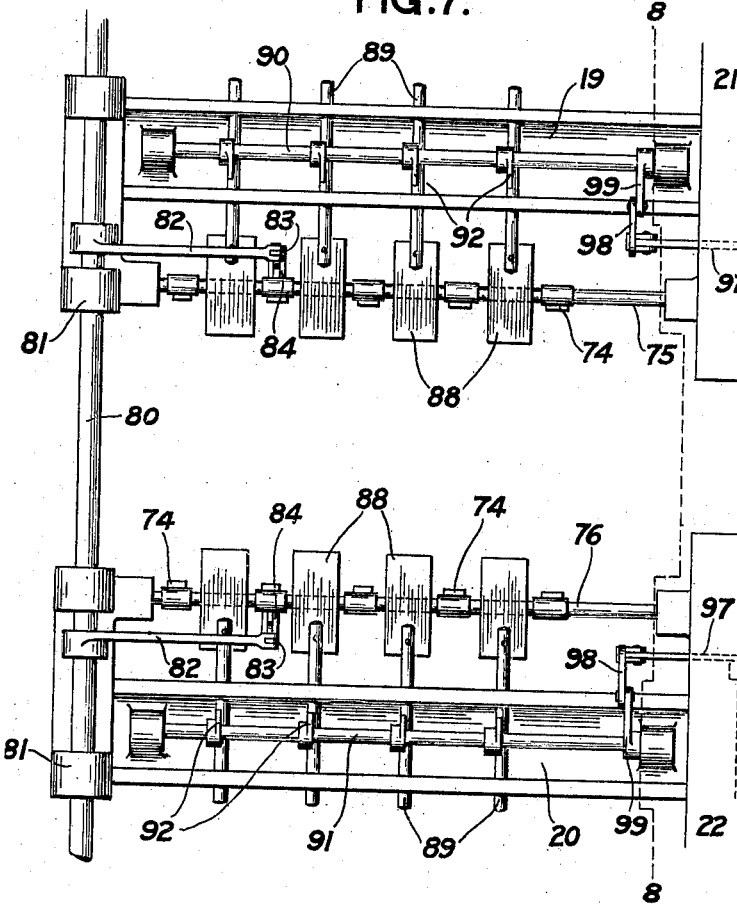
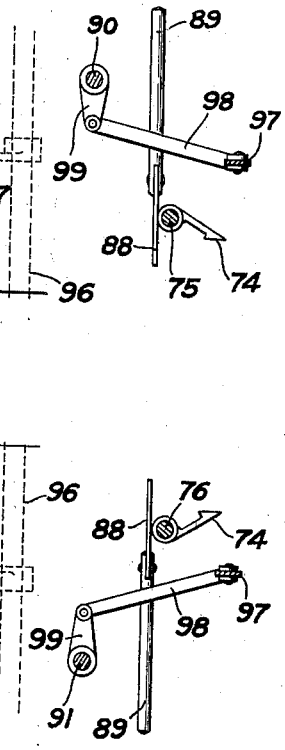

A. B. COWLES.
BOX FOLDING MACHINE.
APPLICATION FILED JAN. 7, 1909.

980,609.

Patented Jan. 3, 1911.

7 SHEETS—SHEET 7.

WITNESSES:
L. Thon
C. W. Carroll

INVENTOR:
Arthur B. Cowles
by Ogark T. Davis
his Attorneys

UNITED STATES PATENT OFFICE.

ARTHUR B. COWLES, OF ROCHESTER, NEW YORK, ASSIGNOR TO THE COWLES CAMP COMPANY, OF ROCHESTER, NEW YORK, A CORPORATION OF NEW YORK.

BOX-FOLDING MACHINE.

980,609.  Specification of Letters Patent.  Patented Jan. 3, 1911.

Application filed January 7, 1909. Serial No. 471,144.

*To all whom it may concern:*

Be it known that I, ARTHUR B. COWLES, a citizen of the United States, and resident of Rochester, in the county of Monroe and State of New York, have invented certain new and useful Improvements in Box-Folding Machines, of which the following is a specification.

This invention relates to box folding machines, and more particularly to the type of machines that apply glue to one edge of a box blank when in the flat, and then fold said edge over to meet the opposite edge of the blank, which is unglued, finally delivering the folded box in flat or unopened form to a magazine.

One object of the invention is to produce a machine that is simple and compact and may be easily and quickly adjusted to fold blanks of different widths.

Other features of novelty will be pointed out in the description and claims.

Figure 1:
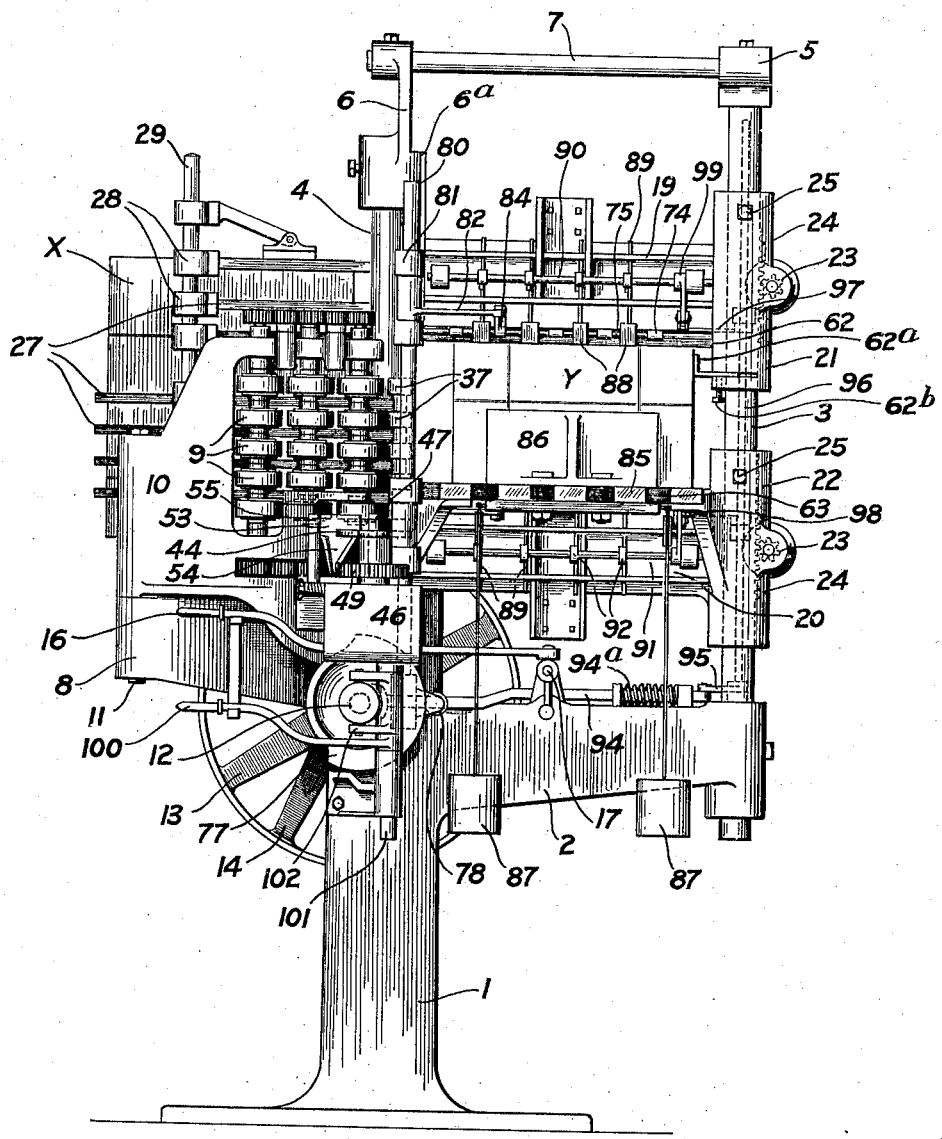
Figure 2:
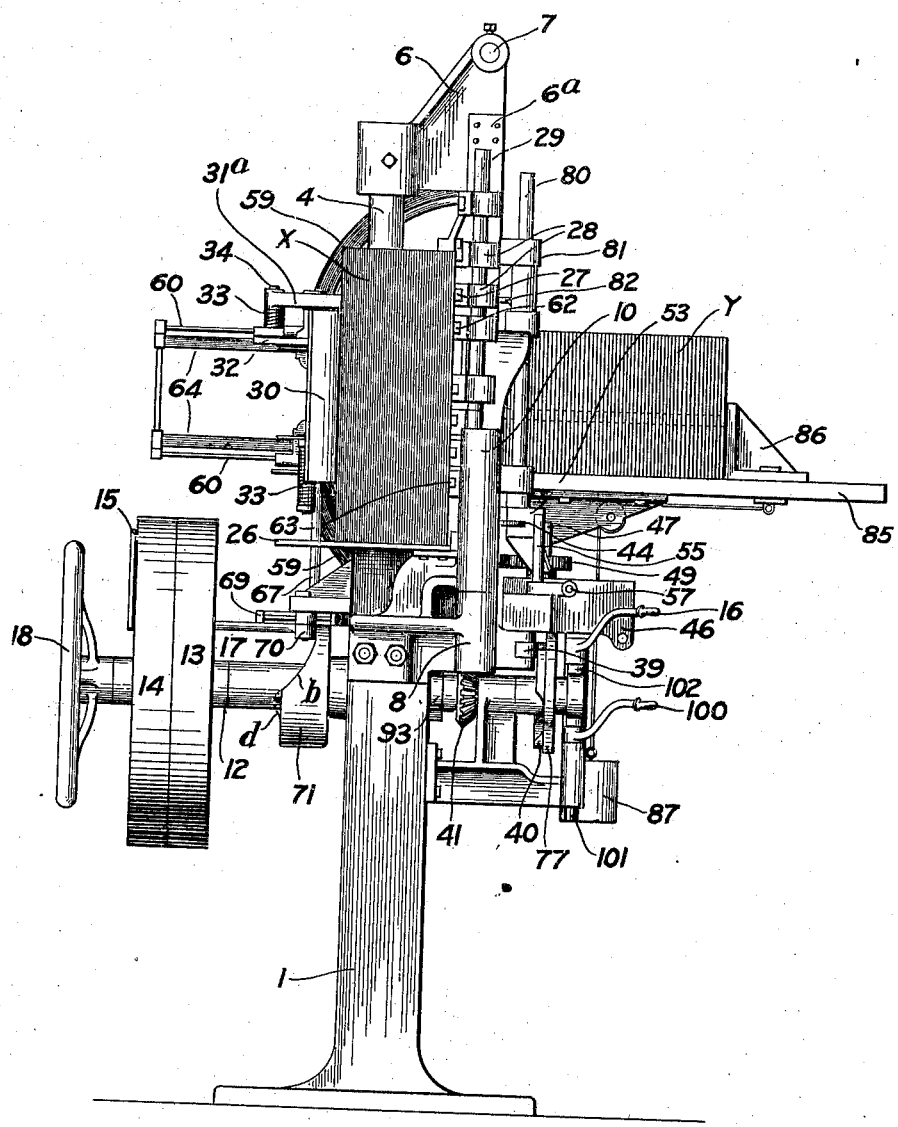
Figure 3:
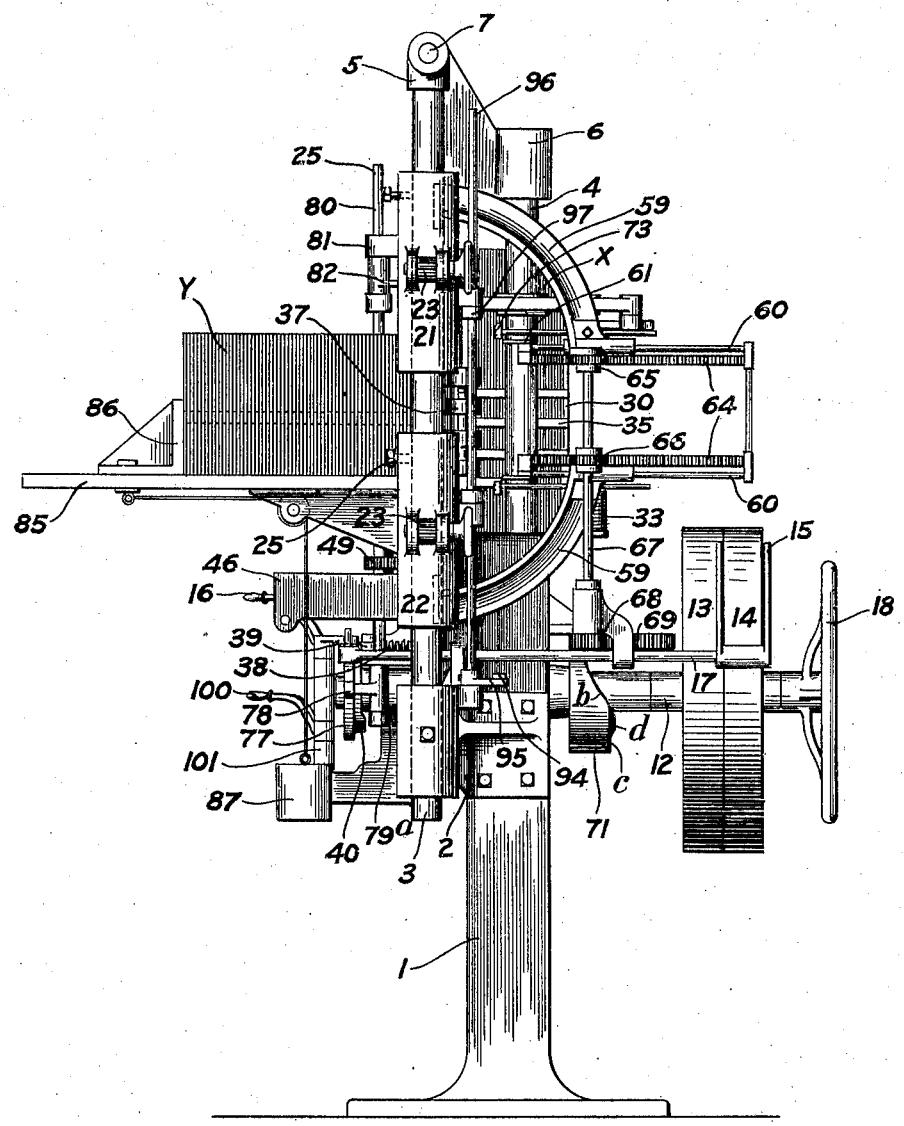
Figure 4:
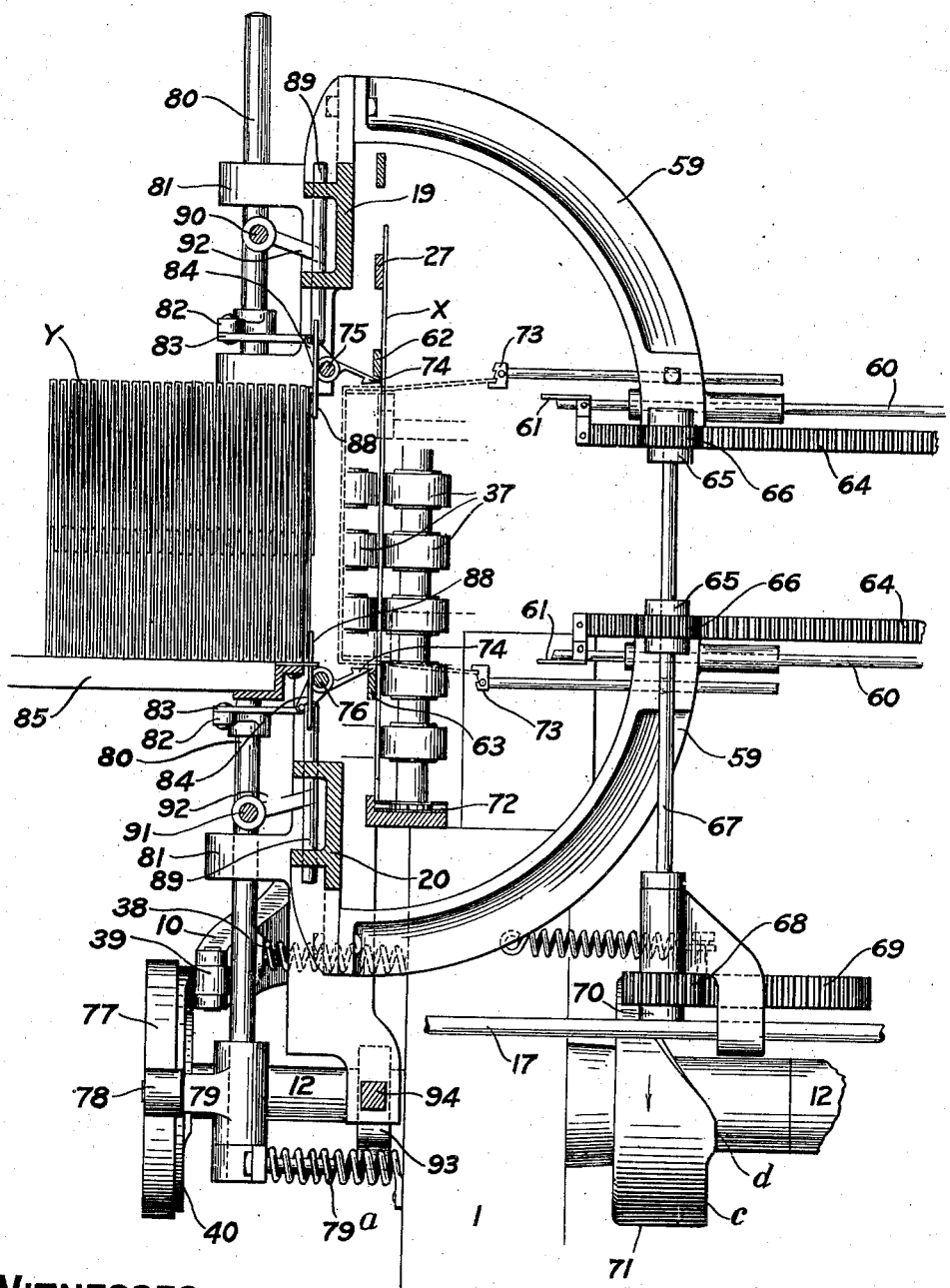
Figure 5:
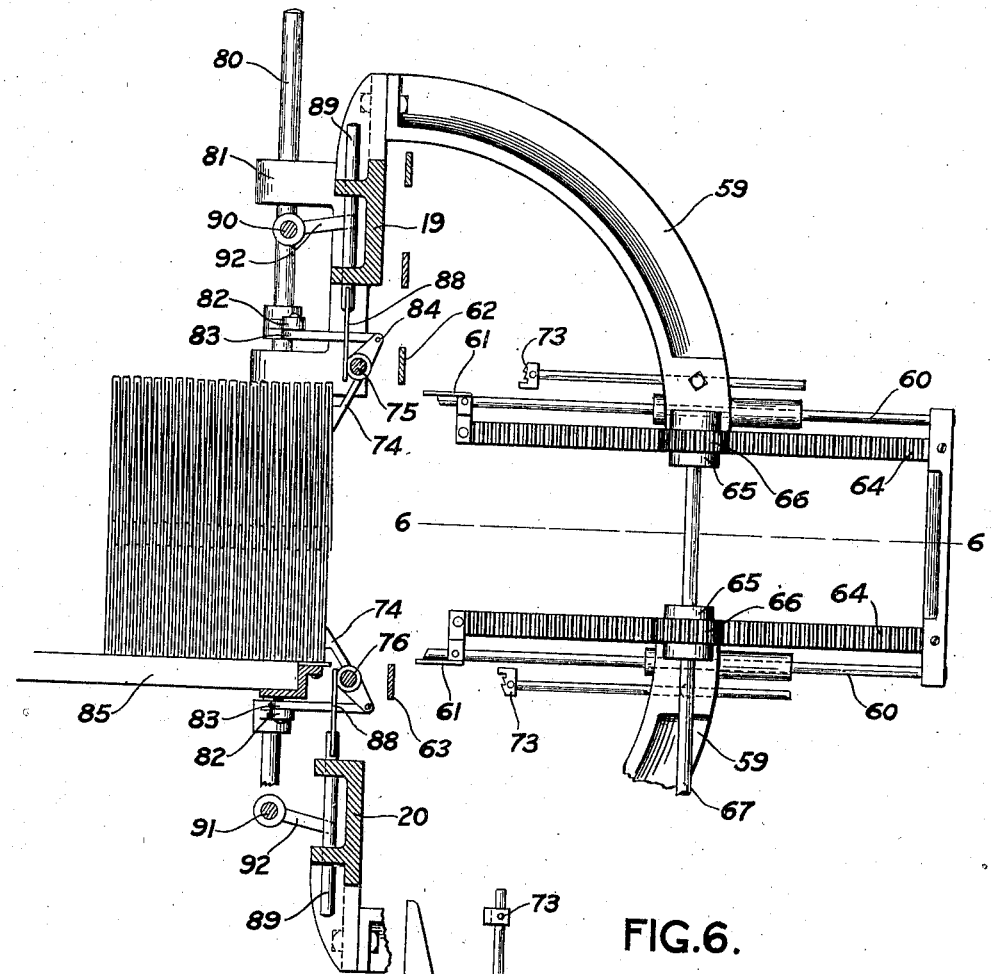
Figure 6:
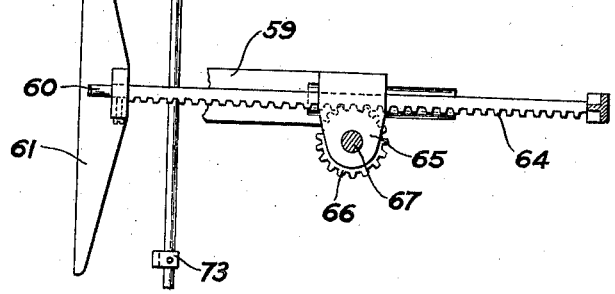
Figure 9:
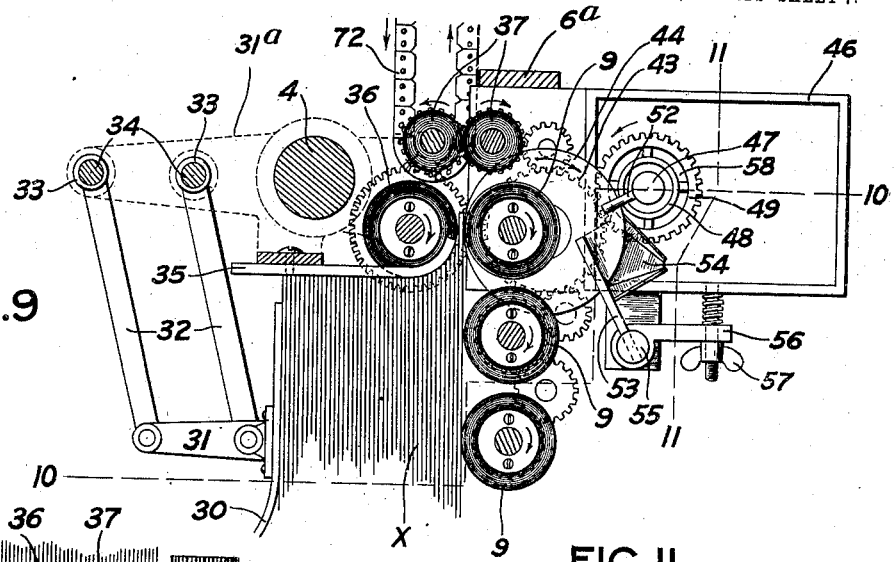
Figure 11:
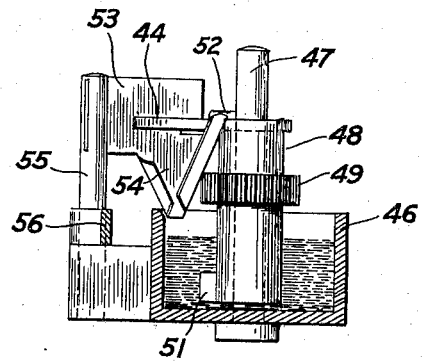
Figure 10:
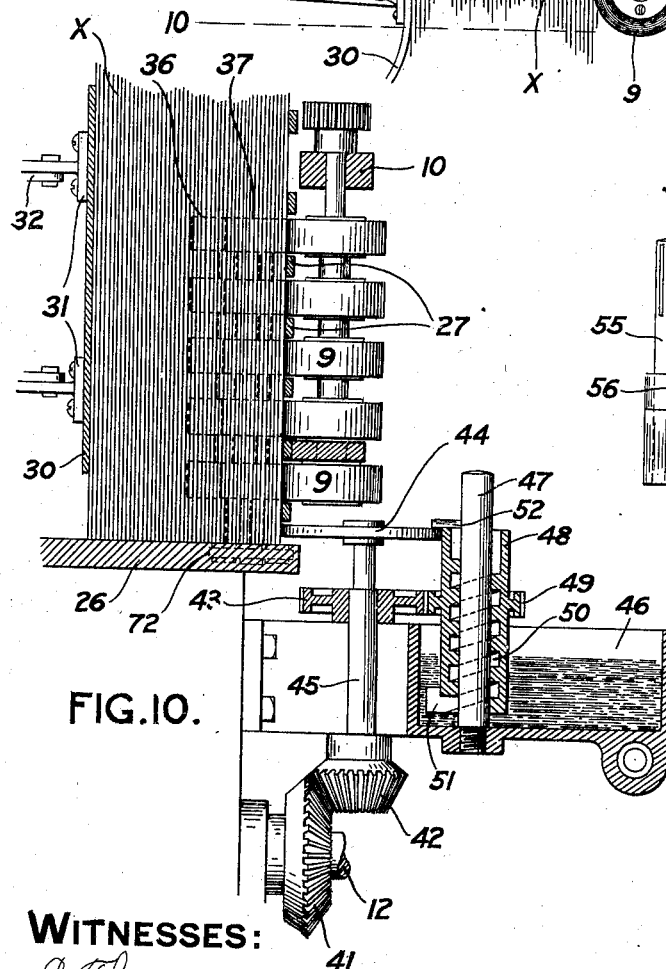

In the drawings:—Figure 1 is an elevation of the right side of the complete machine; Fig. 2 is a front view thereof; Fig. 3 is a rear elevation; Fig. 4 is an enlarged rear elevation and partial section of certain operating parts of the first folding mechanism in one position; Fig. 5 shows certain of the same parts in another position; Fig. 6 is a horizontal section taken on the line 6—6 of Fig. 5; Fig. 7 is a side elevation of the second folding and retaining mechanisms, separated from the rest of the machine; Fig. 8 is a section on the line 8—8 of Fig. 7; Fig. 9 is a plan of the feeding and gluing mechanism; Fig. 10 is a vertical section on the line 10—10 of Fig. 9; Fig. 11 is a section on the line 11—11 of the same figure; and Fig. 12 is a plan of the plunger-operating cam.

The base or standard 1 of the machine has a bracket 2 extending toward the rear, and in said bracket is fixed a post 3. A similar post 4 is supported solidly in the base 1. The posts carry blocks 5 and 6 at their upper ends, which are held together by a tie-rod 7.

The feed mechanism is carried on a bracket 8 that extends forwardly from the post 1. The feed-mechanism comprises rolls 9, that are revolubly supported in a frame 10, and geared together to revolve in the same direction. The frame 10 is in turn capable of a limited lateral movement on a pivot 11.

A driving shaft 12 is supported in the base 1, and carries the usual fast and loose pulleys 13 and 14, and a belt-shifting fork 15 that is operated by a hand-lever 16, through a horizontal rod 17. A hand-wheel 18 is also provided for the purpose of turning the shaft 12 over slowly when adjusting the machine.

The folding apparatus is supported on horizontal cross-bars 19 and 20 carried by sleeves 21 and 22. The latter are movable up or down along the post 3 by means of hand wheels having pinions 23 that engage racks 24 on said post. Moving the sleeve 21 up and the sleeve 22 down carries the crossbars 19 and 20, with the folding apparatus supported thereby, farther apart to accommodate a larger sized box. Moving said sleeves toward each other adapts the folders to a smaller sized box. The sleeves 21 and 22, when adjusted as desired, are maintained in place by setscrews 25. The free ends of the crossbars 19 and 20 are limited to a vertical movement by a guide consisting of a vertical bar $6^a$, Fig. 1, that is fastened at its upper end to the block 6 and at its lower end to the base 1.

The box blanks X "in the flat" or in unfolded condition are stacked on edge upon a table 26 attached to the base 1. The blanks are creased on the fold lines before being placed in the machine. A series of horizontal flat bars 27 extend between the feed rolls 9 and are supported by collars 28 on a vertical post 29 (see Fig. 2). Said bars constitute a set of guides against which the blanks X are held by means of a spring-pressed follower 30. The latter is flared outwardly at its front end to permit a stack of blanks to be placed easily in position (Fig. 9). A pair of brackets 31 on the follower 30 are pivoted to parallel links 32, which are supported on pins 34 on brackets $31^a$ attached to the post 4. Springs 33, Fig. 2, coiled around the pins 34 cause a continual pressure on the follower 30 and force the blanks X tightly against the guides 27. By means of the links 32 the follower 30 is maintained parallel with said bars. The rear ends of the blanks X are alined by a stop 35, Fig. 9, that is curved at one end so as to fit along the periphery of a roll 36. The latter may be styled the retarding roll, as its purpose is to hold back or retard all the blanks except the one that is being carried into the folding frame by the rolls 9 and the auxiliary or supplemental rolls 37. The rolls all revolve in the directions shown by the arrows in Fig. 9, and are geared together in such a manner that they have the same peripheral speed. The rolls 37 revolve in opposite directions and lie in contact with each other, while the other rolls 9 and 36 all revolve in one direction, and are slightly separated. Normally, or during the non-feeding portion of the operation of the machine, the rolls 9 are held away from the innermost of the box blanks X by means of a spring 38, Figs. 3 and 4, that presses the frame 10 toward the right hand side of the machine. A roller 39 on the end of said frame bears against a face-cam 40 on the driving shaft 12, and when the elevation on the cam passes over the roller, the frame 10 is swung slightly to the left on the pivot 11 and carries the rolls 9 in between the bars 27 and against the first of the blanks X. The rolls 9 are connected to the shaft 12 through a set of bevel-gears 41, 42, Fig. 10, and a spur-gear 43, Fig. 9, and therefore rotate continuously. When the frame 10 is moved by the cam 40, as aforesaid, the friction surfaces of the rolls 9 carry the first blank into the machine between the supplemental rolls 37, and the latter then feed it along into the folding-frame, ready to be folded, which operation will be described hereinafter. The box blank is stopped at the correct position with reference to the folding-frame by an adjustable abutment or stop 62ᵃ (Fig. 1) that is supported in a slot in the sleeve 21 and is fastened in its different positions by a setscrew 62ᵇ.

The unfolded blanks X are placed on the table 26 with the glue-margin or the lap to which glue is applied, at the bottom. The gluing apparatus comprises a wheel or disk 44, (Fig. 10) that is fixed to the shaft 45, on which the gear 43 is carried, and therefore revolves continuously. Glue is automatically fed to the periphery of the disk 44, and is wiped off the periphery upon the lap of the box as the latter passes through the feed rolls.

The apparatus for carrying glue to the disk 44 is shown in Figs. 9, 10 and 11. The glue-pan 46, which is a shallow, rectangular box, is supported on the frame 1. Near the inner end of the pan 46 is a post 47, which supports a sleeve 48 that is continuously revolved by a gear 49 engaging the gear 43 on the shaft 45. The sleeve 48 has a coarse internal screw thread 50 that extends from end to end thereof. At the lower end of the sleeve is a blade 51 that catches the glue and directs it into the said screw-thread or spiral channel, the rotation of the parts causing it to run up to the top where it overflows, part being spread out upon the glue-disk 44 by means of a pin 52 projecting from the post 47, and the remainder going down the outside of the sleeve 48 into the pan again. The glue that is spread out on the top of the disk 44 by the pin 52 runs down over the periphery of the disk, but as the latter revolves, it passes through a scraper 53 that removes the surplus, and allows only the requisite quantity of glue to remain on the edge of the disk. A trough 54 (Fig. 11) is provided for returning to the pan all the glue that is taken off by the scraper 53. The latter is supported on a post 55 that is pivoted in the side of the pan 46. An arm 56 extending from the post is movable by means of a nut 57 to carry the scraper in or out so to cover more or less of the disk 44. Perforations 58, Fig. 9, in the gear 49 allow the surplus glue that runs down the outside of the sleeve 48 to reach the pan 46 without getting into the teeth of the gear and so clogging the moving parts.

The folding apparatus may be understood by reference to Figs. 4, 5, 7 and 8. The first folding operation is accomplished by forcing the blank through a die-like frame, the top and bottom rails of which are spaced from each other a distance equal to the width of the box after folding. In passing through this frame, the top and bottom laps of the box are bent downward and upward, respectively, to positions at right angles with the center of the box. The second folding operation is accomplished by fingers that turn the top and bottom laps from the last-mentioned position until they lie flat against the center, the previously glued edge of the bottom lap being pressed upon the corresponding edge of the upper lap. The folded blanks are then delivered successively to a receiving table, still on edge in the vertical position.

Extending toward the left hand side of the machine and supported from the crossbars 19 and 20 are hangers or brackets 59, each of which carries at its end a slidable plunger-rod 60. Each of the latter carries a plate 61 at its end (Fig. 6) that is adapted to strike the blank X (Fig. 4), and press it against the folding frame rails 62, 63. The plates 61 are spaced slightly nearer together than the said rails. Connected with the rods 60 are racks 64, that slide in bearings 65. Said racks are driven in and out to carry the plates 61 into the folding frame, by means of pinions 66 on a revoluble shaft 67. The shaft has at its lower end a pinion 68 that engages a segmental gear 69, and the latter carries a roller 70 (Fig. 12) that runs on a face cam 71. This cam is fixed on the driving shaft 12 and turns continuously therewith, so that the plates 61 are moved in or out according to the contour of the cam-face. When the roller 70 rests at the point $a$ on the cam, the plates are retracted to the position shown in Fig. 4. As the cam revolves, (indicated by the arrow in Fig. 12) the roller rides up the incline $b$, and the resulting movement of the segmental gear 69 carries the plates inwardly to the position shown in Fig. 5. The roller then rests on the "dwell" or inoperative position $c$ of the cam 71, and during this time the feed mechanism operates, as previously described, carrying a blank into the folding frame, along a feed band or chain 72 that moves with the rolls 37 (Fig. 9). The edges of the plates when in this position serve as guides for the blank, which passes between them and the rails 62, 63. When the cam 71 turns further, so that the elevation $d$ strikes the roller 70, the plates are carried up against the blank X and force it through the folding frame, as shown in broken lines in Fig. 4. The top and bottom laps being free are bent downward and upward as aforesaid, and engage retaining stops consisting of toothed blocks 73 that are supported in the brackets 59. Said blocks prevent the laps from moving toward the unfolded position again. The blank is then ready for the second folding operation. This last mentioned operation is accomplished by fingers 74 that are fixed to shafts 75, 76, revolubly supported on the cross-bars 19 and 20, respectively. Said fingers, when in the position shown in Fig. 4, overlap the blank after it has been pushed through the folding-frame. If the shafts 75 and 76 are turned slightly, the fingers 74 engage the upper and lower laps of the blank, and bring them flat against the central portion thereof (Fig. 5) which completes the folding operation. The turning of the shafts 75 and 76 is accomplished through the action of a disk cam 77 carried on the end of the driving shaft 12. A roller 78 bears against said cam, and is carried at the end of a crank 79 that is rigidly attached to a vertical shaft 80. The roller is maintained in contact with the cam by the action of a spring 79$^a$. The shaft 80 is supported in bearings 81, and carries cranks 82 that are connected, by means of links 83, with rocker-arms 84 on the shafts 75 and 76. When the rise of the cam 79 strikes the roller 78, the shaft 80 is turned part way around, and the cranks 82 and links 83 rock the shafts 75 and 76 just far enough to carry the fingers 74 to the position shown in Fig. 5.

The folded boxes Y are stacked up on a receiving table 85 and are pressed tightly together by means of a sliding board 86 that is continuously forced toward them by the action of weights 87 or equivalent devices.

The boxes Y are moved along the table 85 by the pressure of the fingers 74 on the last box that was folded, but when said fingers regain their normal position the boxes must be prevented from springing back into the folding frame. To accomplish this result, retaining stops 88 are provided, that are attached to the ends of rods 89, which are slidable vertically in the flanges of the crossbars 19 and 20. Shafts 90 and 91 are hung in bearings on said crossbars, and carry arms 92 that engage the rods 89. Thus when said shafts are rocked, the rods 89 and the stops 88 are carried up and down, those on the bottom moving oppositely to those at the top. The stops move apart (Fig. 5) at the same time that the fingers 74 move downward, and move toward each other, to form retaining catches for the folded boxes Y, at the moment the said fingers are lifted (Fig. 4). The shafts 90 and 91 are operated through the action of a cam 93 that is fixed on the driving shaft 12 close to the base 1. A rod 94 is pressed against said cam by a spring 94$^a$ (Fig. 1), and is connected to a crank 95 on a vertical rod 96, Fig. 3. The latter is revolubly supported alongside the post 3, and carries arms 97 (Fig. 7) that turn therewith and rock the shafts 90 and 91 by connections thereto through links 98 and rocker arms 99, Fig. 8.

The cams 40 and 77, (Figs. 2 and 4) that operate the feed mechanism and the folding fingers, respectively, are formed from a single piece, and are splined upon the shaft 12. A lever 100 (Figs. 1 and 2) is provided for moving the cams out of line with their respective rollers, and so stopping the operations of feeding and folding. Said lever is pivoted on a stud 101, as is also the belt-shifting lever 16, and has arms 102, that are connected with the end of the cam hub (Fig. 1). It is thus possible to stop part of the machine very quickly, as might be necessary in case a blank failed to pass properly into the folding frame.

It will be noted that the stack of folded boxes on the receiving table 85 is used as a back or abutment in performing the last steps of the folding operation.

In this machine the blanks X and the folded boxes Y are fed in and operated on while maintaining a vertical position on edge, whereby access to both sides and to three edges is unrestricted. Only a small surface of the blank is used for supporting purposes.

The quick adjustability of this machine to fold blanks of different sizes within a wide range of adjustment is a noteworthy feature.

It will be noted that the handling of the box blanks and of the boxes on edge has a number of important results. This system saves first, friction because the edge of the box, and not the flat side, is in contact with the folding mechanism and the feeding mechanism for delivering it thereto; second, it saves damage to the blanks by reason of glue, ink, dirt, &c., lying upon the tables of the mechanism; third, it saves a considerable amount of floor space; fourth, it saves any adjustment of the feeding mechanism because one edge of the blank is always in contact with the table, and the blank will feed accurately to the folding position without requiring any adjustment of the feeding mechanism for blanks of different sizes; fifth, it saves adjustment of the blanks to the glue wheel, or vice versa, and it permits a certain and easy adjustment of the folding mechanism with reference to the definite position to which the blanks are fed; and lastly, because the folded box blanks are delivered to the receiving table on edge, the stack of box blanks may be used as the backing for the last steps of the folding operation, and at the same time the folded blanks are accessible for the removal of any number and for the readjustment of the follower whereby they are supported.

The definite position, to which the blank is fed opposite the folding frame, is determined (a) by the pressure of a vertical edge of the blank against the stop 60ª caused by the action of the feeding chain 72, and (b) by the pressure of the bottom edge of the blank on the chain 72 caused by gravity.

What I claim is:

1. In a box folding machine, guides for supporting a series of box blanks vertically on edge, feeding mechanism for carrying one blank at a time edgewise and on edge from the guides to a folding position, folding mechanism for moving the blank horizontally on edge and folding the same, retaining mechanism for normally holding the folded box blank after delivery from the folding mechanism, and means for moving the retaining mechanism out of the path of movement of the blanks while the same are being folded.

2. In a box folding machine, guides for supporting a series of box blanks vertically on edge, feeding mechanism for carrying one blank at a time edgewise and on edge from the guides to a folding position, folding mechanism for moving the blank horizontally on edge and folding the same, a receiving device for receiving the folded boxes from the folding mechanism and supporting them on edge, retaining mechanism for normally holding the folded box against the previously folded boxes after delivery from the folding mechanism, and means for moving the retaining mechanism out of the path of movement of the blanks while the same are being folded.

3. In a box folding machine, the combination of guides for supporting a series of box blanks, feeding mechanism for removing one blank at a time from the series of blanks and for placing the same opposite a folding frame, a die-like folding frame, a plunger adapted to engage the rear surface of the blank and to force it through the folding frame, folding fingers adapted to move in the same direction as the plunger for completing the folding operation, retaining means adapted to engage the rear surface of the folded blank to hold it after its delivery from the folding mechanism, and means for moving the retaining means out of the path of movement of the next blank while the same is being folded.

4. In a box folding machine, guides for supporting a series of box blanks, feeding mechanism for removing one blank at a time from the series of blanks and for placing the same opposite a folding frame, a die-like folding frame, plunger mechanism for forcing the blanks through the folding frame and partially folding the blank, retaining mechanism for holding the blank in the partially folded position, folding fingers for completing the folding operation, retaining mechanism for holding the folded box after delivery from the folding mechanism, and means for moving the retaining mechanism out of the path of movement of the blanks while the same are being folded.

5. In a box folding machine, means for supporting a series of box blanks, feeding mechanism for removing one blank at a time from the series of blanks and for placing the same opposite a folding frame, a die-like folding frame, mechanism for forcing the blanks into the folding frame and partially folding the blanks, retaining mechanism for holding the flaps of the blank in the partially folded position, and folding means for completing the folding operation and discharging the folded blank from the frame.

6. In a box folding machine, means for supporting a series of box blanks, feeding mechanism for removing one blank at a time from the series of blanks and for placing the same opposite a folding frame, a die-like folding frame, mechanism for forcing the blanks into the folding frame and partially folding the blanks, retaining mechanism for holding a blank in the partially folded position, means for completing the folding operation and removing the folded blank from the frame, and retaining mechanism for holding the folded blank after delivery from the folding mechanism, said mechanism being movable out of the path of movement of the blanks as the same are removed from the folding frame.

7. In a box folding machine, the combination of a feeding mechanism for feeding blanks one by one to a definite position, a pair of frames adjustable to and from each other on opposite sides of the middle line of a blank in said definite position, and mechanism adapted to coöperate with said frames and supported partially on each for folding a blank and delivering it therefrom in the folded condition.

8. In a box folding machine, the combination of a die-like folding frame having two members movable toward and from each other to adjust the frame to blanks of different sizes, two folding-plungers adapted to coöperate with said members, respectively, connections between the plungers and the frame members to preserve their coöperative relation in all adjusted positions of the frame members, and mechanism adapted to actuate the plungers in all adjusted positions.

ARTHUR B. COWLES.

Witnesses:
D. GURNEE,
L. THON.